(12) United States Patent
John et al.

(10) Patent No.: US 12,480,867 B2
(45) Date of Patent: Nov. 25, 2025

(54) METHODS AND APPARATUS FOR MEASURING METHANE EMISSIONS WITH AN OPTICAL OPEN-CAVITY METHANE SENSOR

(71) Applicant: SeekOps Inc., Austin, TX (US)

(72) Inventors: Garrett Niall John, Escondido, CA (US); James Rutherford, Cypress, TX (US); Brendan James Smith, Lakeway, TX (US)

(73) Assignee: SeekOps Inc., Austin, TX (US)

( * ) Notice: Subject to any disclaimer, the term of this patent is extended or adjusted under 35 U.S.C. 154(b) by 228 days.

(21) Appl. No.: 18/033,948

(22) PCT Filed: Oct. 26, 2021

(86) PCT No.: PCT/US2021/056710
§ 371 (c)(1),
(2) Date: Apr. 26, 2023

(87) PCT Pub. No.: WO2022/093864
PCT Pub. Date: May 5, 2022

(65) Prior Publication Data
US 2023/0393057 A1    Dec. 7, 2023

Related U.S. Application Data

(60) Provisional application No. 63/106,195, filed on Oct. 27, 2020.

(51) Int. Cl.
G01N 21/31    (2006.01)
G01N 1/22    (2006.01)

(52) U.S. Cl.
CPC ........... *G01N 21/31* (2013.01); *G01N 1/2202* (2013.01); *G01N 2201/06113* (2013.01); *G01N 2201/0636* (2013.01)

(58) Field of Classification Search
CPC ................. G01N 21/31; G01N 1/2202; G01N 2201/0636; G01N 2201/06113
See application file for complete search history.

(56) References Cited

U.S. PATENT DOCUMENTS 3,780,566 A    12/1973    Smith et al.
4,135,092 A    1/1979    Milly
(Continued)

FOREIGN PATENT DOCUMENTS

AU    3401499 A    11/1999
CN    101470072 A    7/2009
(Continued)

OTHER PUBLICATIONS

Development of a mobile tracer correlation method for assessment of air emissions from landfills and other area sources, Atmospheric Environment 102 (2015) 323-330. T.A. Foster-Wittig et al. 2015.
(Continued)

*Primary Examiner* — Kevin K Pyo
*Assistant Examiner* — Don J Williams
(74) *Attorney, Agent, or Firm* — Command IP LLP; Michael Zarrabian

(57)    ABSTRACT

Systems, devices, and methods including: an air inlet configured to receive air; an air outlet configured to expel air; a duct connected between the air inlet and the air outlet; and an open-cavity optical sensor disposed in the duct, where an air flow stream within the duct passes through the open-cavity optical sensor.

20 Claims, 15 Drawing Sheets

(56) References Cited

U.S. PATENT DOCUMENTS

| | | | |
|---|---|---|---|
| 4,233,564 A | 11/1980 | Kerbel | |
| 4,507,558 A | 3/1985 | Bonne | |
| 4,651,010 A * | 3/1987 | Javan | G01N 21/643 436/166 |
| 4,988,833 A | 1/1991 | Lai | |
| 5,047,639 A | 9/1991 | Wong | |
| 5,075,619 A | 12/1991 | Said | |
| 5,173,749 A | 12/1992 | Tell et al. | |
| 5,291,265 A | 3/1994 | Kebabian | |
| 5,317,156 A | 5/1994 | Cooper et al. | |
| 5,767,780 A | 6/1998 | Smith et al. | |
| 5,822,058 A | 10/1998 | Adler-Golden et al. | |
| 6,064,488 A | 5/2000 | Brand et al. | |
| 6,295,859 B1 | 10/2001 | Hayden et al. | |
| 6,356,350 B1 | 3/2002 | Silver et al. | |
| 6,509,566 B1 | 1/2003 | Wamsley et al. | |
| 6,549,630 B1 | 4/2003 | Bobisuthi | |
| 7,162,933 B2 | 1/2007 | Thompson et al. | |
| 7,800,751 B1 | 9/2010 | Silver et al. | |
| 7,833,480 B2 | 11/2010 | Blazewicz et al. | |
| 8,060,270 B2 | 11/2011 | Vian et al. | |
| 8,294,899 B2 | 10/2012 | Wong | |
| 8,451,120 B2 | 5/2013 | Johnson, Jr. et al. | |
| 8,730,461 B2 | 5/2014 | Andreussi | |
| 9,183,371 B2 | 11/2015 | Narendra et al. | |
| 9,183,731 B1 | 11/2015 | Bokhary | |
| 9,235,974 B2 | 1/2016 | Johnson, Jr. et al. | |
| 9,250,175 B1 | 2/2016 | McManus | |
| 9,494,511 B2 | 11/2016 | Wilkins | |
| 9,599,529 B1 | 3/2017 | Steele et al. | |
| 9,599,597 B1 | 3/2017 | Steele et al. | |
| 10,023,311 B2 | 7/2018 | Lai et al. | |
| 10,023,323 B1 | 7/2018 | Roberts et al. | |
| 10,031,040 B1 | 7/2018 | Smith et al. | |
| 10,126,200 B1 | 11/2018 | Steele et al. | |
| 10,268,198 B2 | 4/2019 | Mantripragada et al. | |
| 10,325,485 B1 | 6/2019 | Schuster | |
| 10,365,646 B1 | 7/2019 | Farnsworth et al. | |
| 10,429,546 B1 | 10/2019 | Ulmer | |
| 10,677,771 B2 | 6/2020 | Dittberner et al. | |
| 10,753,864 B2 | 8/2020 | Kasten et al. | |
| 10,816,458 B2 | 10/2020 | Kasten et al. | |
| 10,830,034 B2 | 11/2020 | Cooley et al. | |
| 10,962,437 B1 | 3/2021 | Nottrott et al. | |
| 11,105,784 B2 | 8/2021 | Kukreja et al. | |
| 11,112,308 B2 | 9/2021 | Kreitinger et al. | |
| 11,275,068 B2 | 3/2022 | Willett | |
| 11,299,268 B2 | 4/2022 | Christensen et al. | |
| 11,519,855 B2 | 12/2022 | Black et al. | |
| 11,557,212 B2 | 1/2023 | Hong | |
| 11,614,430 B2 | 3/2023 | Buckingham et al. | |
| 11,619,562 B2 | 4/2023 | Leen et al. | |
| 11,710,411 B2 | 7/2023 | Van Meeteren et al. | |
| 11,748,866 B2 | 9/2023 | Vargas | |
| 12,015,386 B2 | 6/2024 | Gatabi et al. | |
| 2002/0005955 A1 | 1/2002 | Kramer et al. | |
| 2003/0160174 A1 | 8/2003 | Grant et al. | |
| 2003/0189711 A1 | 10/2003 | Orr et al. | |
| 2003/0230716 A1 | 12/2003 | Russell et al. | |
| 2004/0012787 A1 | 1/2004 | Galle et al. | |
| 2004/0017762 A1 | 1/2004 | Sogawa et al. | |
| 2004/0212804 A1 | 10/2004 | Neff et al. | |
| 2006/0015290 A1 | 1/2006 | Warburton et al. | |
| 2006/0044562 A1 | 3/2006 | Hagene et al. | |
| 2006/0232772 A1 | 10/2006 | Silver | |
| 2006/0234621 A1 | 10/2006 | Desrochers et al. | |
| 2007/0137318 A1 | 6/2007 | Desrochers et al. | |
| 2008/0169934 A1 | 7/2008 | Lang et al. | |
| 2008/0243372 A1 | 10/2008 | Bodin et al. | |
| 2009/0201507 A1 | 8/2009 | Kluczynski et al. | |
| 2009/0263286 A1 | 10/2009 | Isomura et al. | |
| 2009/0326792 A1 | 12/2009 | McGrath | |
| 2010/0004798 A1 | 1/2010 | Bodin et al. | |
| 2010/0131207 A1 | 5/2010 | Lippert et al. | |
| 2010/0140478 A1 | 6/2010 | Wilson et al. | |
| 2010/0147081 A1 | 6/2010 | Thomas | |
| 2011/0035149 A1 | 2/2011 | McAndrew et al. | |
| 2011/0074476 A1 | 3/2011 | Heer et al. | |
| 2011/0150035 A1 | 6/2011 | Hanson et al. | |
| 2011/0164251 A1 | 7/2011 | Richter | |
| 2011/0213554 A1 | 9/2011 | Archibald et al. | |
| 2011/0242659 A1 | 10/2011 | Eckles et al. | |
| 2011/0257944 A1 | 10/2011 | Du et al. | |
| 2012/0120397 A1 | 5/2012 | Furtaw et al. | |
| 2013/0044314 A1 | 2/2013 | Koulikov et al. | |
| 2013/0061692 A1 * | 3/2013 | Muresan | G01N 33/0031 73/863 |
| 2013/0076900 A1 | 3/2013 | Mrozek et al. | |
| 2013/0208262 A1 | 8/2013 | Andreussi | |
| 2014/0172323 A1 | 6/2014 | Marino | |
| 2014/0204382 A1 | 7/2014 | Christensen | |
| 2014/0236390 A1 | 8/2014 | Mohamadi | |
| 2014/0336957 A1 | 11/2014 | Hanson et al. | |
| 2015/0039256 A1 * | 2/2015 | Michalske | F02D 41/1458 702/104 |
| 2015/0072633 A1 | 3/2015 | Massarella et al. | |
| 2015/0145954 A1 | 5/2015 | Pulleti et al. | |
| 2015/0226575 A1 | 8/2015 | Rambo | |
| 2015/0275114 A1 | 10/2015 | Tumiatti et al. | |
| 2015/0295543 A1 | 10/2015 | Brown et al. | |
| 2015/0316473 A1 | 11/2015 | Kester et al. | |
| 2015/0323449 A1 | 11/2015 | Jones et al. | |
| 2015/0336667 A1 | 11/2015 | Srivastava et al. | |
| 2016/0018373 A1 | 1/2016 | Pagé et al. | |
| 2016/0070265 A1 | 3/2016 | Liu et al. | |
| 2016/0104250 A1 | 4/2016 | Allen et al. | |
| 2016/0146696 A1 | 5/2016 | Steele et al. | |
| 2016/0161456 A1 | 6/2016 | Risk et al. | |
| 2016/0202225 A1 | 7/2016 | Feng et al. | |
| 2016/0214715 A1 | 7/2016 | Meffert | |
| 2016/0216172 A1 | 7/2016 | Rella et al. | |
| 2016/0307447 A1 | 10/2016 | Johnson et al. | |
| 2016/0357192 A1 | 12/2016 | McGrew et al. | |
| 2017/0003684 A1 | 1/2017 | Knudsen et al. | |
| 2017/0057081 A1 | 3/2017 | Krohne et al. | |
| 2017/0089829 A1 | 3/2017 | Bartholomew et al. | |
| 2017/0093122 A1 | 3/2017 | Bean et al. | |
| 2017/0097274 A1 | 4/2017 | Thorpe et al. | |
| 2017/0115218 A1 | 4/2017 | Huang et al. | |
| 2017/0134497 A1 | 5/2017 | Harter et al. | |
| 2017/0158353 A1 | 6/2017 | Schmick | |
| 2017/0199647 A1 | 7/2017 | Richman et al. | |
| 2017/0206648 A1 | 7/2017 | Marra et al. | |
| 2017/0235018 A1 | 8/2017 | Foster et al. | |
| 2017/0259920 A1 | 9/2017 | Lai et al. | |
| 2017/0290034 A1 | 10/2017 | Desai et al. | |
| 2017/0307519 A1 | 10/2017 | Black et al. | |
| 2017/0336281 A1 | 11/2017 | Waxman et al. | |
| 2017/0339820 A1 | 11/2017 | Foster et al. | |
| 2018/0023974 A1 | 1/2018 | Otani et al. | |
| 2018/0024091 A1 | 1/2018 | Wang et al. | |
| 2018/0045561 A1 | 2/2018 | Leen et al. | |
| 2018/0045596 A1 | 2/2018 | Prasad et al. | |
| 2018/0050798 A1 | 2/2018 | Kapuria | |
| 2018/0059003 A1 | 3/2018 | Jourdainne et al. | |
| 2018/0067066 A1 | 3/2018 | Giedd et al. | |
| 2018/0095478 A1 | 4/2018 | van Cruyningen | |
| 2018/0109767 A1 | 4/2018 | Li et al. | |
| 2018/0122246 A1 | 5/2018 | Clark | |
| 2018/0127093 A1 | 5/2018 | Christensen et al. | |
| 2018/0188129 A1 | 7/2018 | Choudhury et al. | |
| 2018/0209902 A1 | 7/2018 | Myshak et al. | |
| 2018/0259955 A1 | 9/2018 | Noto | |
| 2018/0266241 A1 | 9/2018 | Ferguson et al. | |
| 2018/0266946 A1 | 9/2018 | Kotidis et al. | |
| 2018/0284088 A1 | 10/2018 | Verbeck, IV | |
| 2018/0292374 A1 | 10/2018 | Dittberner et al. | |
| 2018/0321692 A1 | 11/2018 | Castillo-Effen et al. | |
| 2018/0322699 A1 | 11/2018 | Gray et al. | |
| 2019/0011920 A1 | 1/2019 | Heinonen et al. | |
| 2019/0011935 A1 | 1/2019 | Ham et al. | |
| 2019/0025199 A1 | 1/2019 | Koulikov | |
| 2019/0033194 A1 | 1/2019 | DeFreez et al. | |
| 2019/0049364 A1 | 2/2019 | Rubin | |

(56) References Cited

U.S. PATENT DOCUMENTS

| | | |
|---|---|---|
| 2019/0066479 A1 | 2/2019 | Wesley et al. |
| 2019/0077506 A1 | 3/2019 | Shaw et al. |
| 2019/0086202 A1 | 3/2019 | Guan et al. |
| 2019/0095687 A1 | 3/2019 | Shaw et al. |
| 2019/0154874 A1 | 5/2019 | Shams et al. |
| 2019/0178743 A1 | 6/2019 | Mcneil |
| 2019/0195789 A1 | 6/2019 | Pan et al. |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1 | 8/2019 | Tanomura et al. |
| 2019/0331652 A1 | 10/2019 | Ba et al. |
| 2020/0050189 A1 | 2/2020 | Gu et al. |
| 2020/0065433 A1 | 2/2020 | Duff et al. |
| 2020/0109976 A1 | 4/2020 | Ajay et al. |
| 2020/0135036 A1 | 4/2020 | Campbell |
| 2020/0182779 A1 | 6/2020 | Kasten et al. |
| 2020/0249092 A1 | 8/2020 | Podmore et al. |
| 2020/0309690 A1* | 10/2020 | Green .................. G01N 21/274 |
| 2020/0373172 A1 | 11/2020 | Suzuki |
| 2020/0400635 A1 | 12/2020 | Potyrailo et al. |
| 2021/0017926 A1 | 1/2021 | Alkadi et al. |
| 2021/0037197 A1 | 2/2021 | Kester et al. |
| 2021/0055180 A1 | 2/2021 | Thorpe et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0199565 A1 | 7/2021 | John et al. |
| 2021/0247369 A1 | 8/2021 | Nottrott et al. |
| 2021/0255158 A1 | 8/2021 | Smith et al. |
| 2021/0300591 A1 | 9/2021 | Tian |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0082495 A1 | 3/2022 | Kreitinger et al. |
| 2022/0113290 A1 | 4/2022 | Smith et al. |
| 2022/0170810 A1 | 6/2022 | Miller, II et al. |
| 2022/0268952 A1 | 8/2022 | Liang et al. |
| 2022/0341806 A1 | 10/2022 | Miller et al. |
| 2022/0357231 A1 | 11/2022 | Nahata et al. |
| 2023/0194487 A1 | 6/2023 | Buckingham et al. |
| 2023/0213413 A1 | 7/2023 | Mohr, Jr. et al. |
| 2023/0274651 A1 | 8/2023 | McGuire et al. |
| 2023/0392498 A1 | 12/2023 | Srivastav et al. |

FOREIGN PATENT DOCUMENTS

| | | |
|---|---|---|
| CN | 104458588 A | 3/2015 |
| CN | 205749271 U | 11/2016 |
| CN | 106568516 A | 4/2017 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 A1 | 7/2017 |
| FR | 3047073 B1 | 8/2019 |
| GB | 2538563 A | 11/2016 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020030885 A1 | 2/2020 |
| WO | 2020086499 A1 | 4/2020 |
| WO | 2020206006 A1 | 10/2020 |
| WO | 2020206008 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

Measurements of Methane Emissions from Landfills Using a Time Correlation Tracer Method Based on FTIR Absorption Spectroscopy, Environ. Sci. Technol. 2001, 35, 21-25, B. Galle et. al. 2001.

Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.

Feng, Lingbing, Nowak, Gen, O'Neill, T.J., Welsh, A.H."Cutoff; A spatio-temporal imputation method." Journal of Hydrology 519 (2014) : 3591-3605 (Year:2014).

International Search Report and Written Opinion for PCT/US2023/023933 mailed Sep. 26, 2023.

International Search Report and Written Opinion for PCT/US23/13893, mailed Jun. 30, 2023.

International Search Report and Written Opinion for PCT/US23/23905 mailed Oct. 5, 2023.

IEEE Conference Paper, "Research of the high pressure jet performance of small size nozzle," ISBN :978-1-5090-1087-5, Publication Date : Oct. 1, 2016, Conference dates Oct. 10, 2016 thru Oct. 12, 2016.[retrieved from the Internet] on Sep. 1, 2023 at 4:14pm.

Field Trial of Methane Emission Quantification Technologies, Society of Petroleum Engineers, SPE-201537-MS, Allen et al., Oct. 2020.

Cabreira et al. "Survey on Coverage Path Planning with Unmanned Aerial Vehicles", published: Drones, published: Jan. 2019, pp. 1-38, year 2019.

Coombes et al., "Optimal Polygon Decomposition for UAV Survey Coverage Path Planning in Wind", published: Jul. 2018, publisher: 'Sensors' (Year:2018).

He et al. "Static Targets' Track Path for UAVs Meeting the Revisit Interval Requirement", published :2013, publisher : IEEE (Year:2013).

Tao Lei et al:"Low-power, open-path mobile sensing platform for high-resolution measurements of greenhouse gases and air pollutants", Applied Physics B, Springer Berlin Heidelberg, Berlin/Heidelberg, vol. 119, No. 1, Mar. 10, 2015 (Mar. 10, 2015), pp. 153.-164, XP035445836, ISSN: 0946-2171, DOI:10.1007/S00340-015-6069-1 [retrieved on Mar. 10, 2015].

Tarsitano C G et al: Multilaser Herriott Cell for Planetary Tunable Laser Spectrometers, Applied Optics , Optical Society of America, Washington, DC, US, vol. 46, No. 28, Oct. 1, 2007 (Oct. 1, 2007), pp. 6923-6935, XP001508502, ISSN:0003-6935, DOI: 10.1364/AO.46.006923.

U.S. Appl. No. 62/687,147, filed Jun. 19, 2018, Brendan James Smith.

"Safesite Multi-Threat Detection System", Jul. 11, 2012 (Jul. 11, 2012), pp. 1-6, XP055245980.

International Search Report and Written Opinion for PCT/US19/38011 mailed Sep. 9, 2019.

International Search Report and Written Opinion for PCT/US19/38015, mailed Oct. 18, 2019.

(56) References Cited

OTHER PUBLICATIONS

International Search Report and Written Opinion for PCT/US19/44119, mailed Oct. 17, 2019.
International Search Report and Written Opinion for PCT/US20/26228 mailed Jul. 1, 2020.
International Search Report and Written Opinion for PCT/US20/26232 mailed Jun. 26, 2020.
International Search Report and Written Opinion for PCT/US20/26246 mailed Jun. 29, 2020.
International Search Report and Written Opinion for PCT/US20/51696, mailed Feb. 3, 2021.
International Search Report and Written Opinion for PCT/US2020/044978, mailed Oct. 26, 2020.
International Search Report and Written Opinion for PCT/US2021/016821 mailed Apr. 26, 2021.
International Search Report and Written Opinion for PCT/US2021/024177, mailed Jun. 23, 2021.
International Search Report and Written Opinion for PCT/US2021/056708, mailed Jan. 27, 2022.
International Search Report and Written Opinion for PCT/US21/42061, mailed Nov. 26, 2021.
International Search Report and Written Opinion for PCT/US21/44532, mailed Jan. 11, 2022.
International Search Report and Written Opinion for PCT/US21/56710, mailed Feb. 23, 2022.
International Search Report and Written Opinion for PCT/US22/38951, mailed Nov. 28, 2022.
International Search Report and Written Opinion of PCT/US19/57305, mailed Jan. 2, 2020.
International Search Report and Written Opinion of PCT/US20/54117, mailed Dec. 22, 2020.
Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Kelly J F et al. "A capillary absorption spectrometer for stable carbon isotope ratio (C/C) analysis in very small samples", Review of Scientific Instruments, American Institute of Physics, 2 Huntington Quadrangle, Melville, NY 11747, vol. 83, No. 2, Feb. 1, 2012 (Feb. 1, 2012), pp. 23101-23101, XP012161835, ISSN: 0034-6748, DOI: 10.1063/1.3680593.
Khan, "Low Power Greenhouse Gas Sensors for Unmanned Aerial Vehicles", Remote Snse. 2012, 4, 1355-1368.
Krings et al., Atmos. Meas. Tech., 11, 721-739, Feb. 7, 2018.
Lilian Joly, The evolution of AMULSE (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C. et al., Interpreting seasonal changes in the carbon balance of southern Amazonia using measurements of XCO2 and chlorophyll fluorescence from GOSAT, Geophysical Research Letters, vol. 40.2829-2833, doi: 10.1002/grl.50452, 2013 pp. 0 2829-2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.
Feitz Andrew et al: "The Ginninderra CH4 and CO2 release experiment: An evaluation of gas detection and quantification techniques", International Journal of Greenhouse Gas Control, Elsevier, Amsterdam, NL, vol. 70, Mar. 15, 2018 (Mar. 15, 2018), pp. 202-224, XP085368237, ISSN: 1750-5836, DOI: 10.1016/J.IJGGC.2017.11.018.
Jensen Morten Bang et al: "Quantification of greenhouse gas emissions from a biological waste treatment facility", Waste Management, Elsevier, New York, NY, US, vol. 67, May 29, 2017 (May 29, 2017), pp. 375-384, XP085157318, ISSN: 0956-053X, DOI: 10.1016/J.WASMAN.2017.05.033.
Mohn Joachim et al: "A dual tracer ratio method for comparative emission measurements in an experimental dairy housing", Atmospheric Environment, Elsevier, Amsterdam, NL, vol. 179, Feb. 1, 2018 (Feb. 1, 2018), pp. 12-22, XP085370597, ISSN: 1352-2310, DOI: 10.1016/J.ATMOSENV.2018.01.057.
Day, S., and et al. "Characterisation of regional fluxes of methane in the Surat Basin, Queensland, Phase 1: A review and analysis of literature on methane detection and flux determination." (2013) (Year: 2013).

\* cited by examiner

METHODS AND APPARATUS FOR MEASURING METHANE EMISSIONS WITH AN OPTICAL OPEN-CAVITY METHANE SENSOR

CROSS-REFERENCE TO RELATED APPLICATION

This application is a 35 U.S.C § 371 National Stage Entry of International Application No. PCT/US21/56710, filed Oct. 26, 2021, which claims the priority benefit of U.S. Provisional Patent Application Ser. No. 63/106,195 filed Oct. 27, 2020, all of which are hereby incorporated herein by reference in their entirety for all purposes.

FIELD OF ENDEAVOR

The invention relates to monitoring greenhouse gasses, and more particularly to gas sensors for detecting greenhouses gasses.

BACKGROUND

Methane ($CH_4$) is an odorless and colorless naturally occurring organic molecule, which is present in the atmosphere at average ambient levels of approximately 1.85 ppm as of 2018 and is projected to continually climb. Methane is a powerful greenhouse gas, a source of energy (i.e., methane is flammable), and an explosion hazard, and so detection of methane is of utility to scientists as well as engineers. While methane is found globally in the atmosphere, a significant amount is collected or "produced" through anthropogenic processes including exploration, extraction, and distribution of petroleum resources as a component in natural gas. Natural gas, an odorless and colorless gas, is a primary fuel used to produce electricity and heat. The main component of natural gas is typically methane, and the concentration of methane in a stream of natural gas can range from about 70% to 90%. The balance of the gas mixture in natural gas consists of longer chain hydrocarbons, including ethane, propane, and butane, typically found in diminishing mole fractions that depend on the geology of the earth from which the gas is extracted. Once extracted from the ground, natural gas is processed into a product that must comply with specifications for both transport, taxation, and end-use in burners; specification of processed 'downstream' natural gas product control for the composition of the gas, so as to protect transport lines from corrosion and ensure proper operation of burners and turbines. While extraction of natural gas is one of the main sources of methane in the atmosphere, major contributors of methane also include livestock farming (i.e., enteric fermentation) and solid waste and wastewater treatment (i.e., anaerobic digestion). Anaerobic digestion and enteric fermentation gas products consist primarily of methane and lack additional hydrocarbon species. Additionally, the methane produced by formal anaerobic digestion processes, known as 'biogas', can be used at the farm for heat, power or other fuel applications, or can be upgraded on site to biomethane, where it can be put into the pipeline/gas grid.

SUMMARY

A system embodiment may include: an air inlet configured to receive air; an air outlet configured to expel air; a duct connected between the air inlet and the air outlet; and an open-cavity optical sensor disposed in the duct, where an air flow stream within the duct passes through the open-cavity optical sensor.

Additional system embodiments may further include: a low pressure trap disposed in the duct prior to the air flow stream passing through the open-cavity optical sensor. In additional system embodiments, the low pressure trap may be configured to remove dust from the air flow stream prior to reaching the open-cavity optical sensor. In additional system embodiments, the low pressure trap may be configured to remove condensed moisture from the air flow stream prior to reaching the open-cavity optical sensor.

In additional system embodiments, the duct comprises a first cross sectional area, where the low pressure trap comprises a second cross sectional area, and where the second cross sectional area may be larger than the first cross sectional area. In additional system embodiments, the open-cavity optical sensor may be in communication with a processor to monitor real-time trace gas emissions. In additional system embodiments, the open-cavity optical sensor may be an open-cavity laser spectroscopy sensor.

Additional system embodiments may include: a membrane disposed before the open-cavity optical sensor in the air flow stream. In additional system embodiments, the membrane may be configured to remove dust from the air flow stream prior to reaching the open-cavity optical sensor. In additional system embodiments, the membrane may be configured to remove condensed moisture from the air flow stream prior to reaching the open-cavity optical sensor.

Additional system embodiments may include: a fan disposed after the open-cavity optical sensor in the air flow stream, where the fan may be configured to expel the air flow stream via the air outlet.

A method embodiment may include: receiving air into a duct from an air inlet in an air flow stream; passing the air flow stream through an open-cavity optical sensor disposed in the duct; and expelling the air flow stream out of the duct through an air outlet after passing through the open-cavity optical sensor.

Additional method embodiments may include: receiving air into a low pressure trap disposed in the duct prior to the air flow stream passing through the open-cavity optical sensor. Additional method embodiments may include: removing dust from the air flow stream via the low pressure trap prior to reaching the open-cavity optical sensor. Additional method embodiments may include: removing condensed moisture from the air flow stream via the low pressure trap prior to reaching the open-cavity optical sensor.

Additional method embodiments may include: measuring real-time trace gas emissions from the open-cavity optical sensor; and monitoring the real-time trace gas emissions via the measurements from the open-cavity optical sensor in communication with a processor. In additional method embodiments, the open-cavity optical sensor may be an open-cavity laser spectroscopy sensor.

Another system embodiment may include: a sample inlet configured to receive ambient gas; a membrane configured to filter at least one of: dust and condensed moisture from the ambient gas; a sample chamber configured to measure real-time trace gas emissions from the filtered ambient gas; a fan disposed after the sample chamber; and a sample exhaust, where the fan may be configured to expel the measured ambient gas via the sample exhaust.

In additional system embodiments, the sample chamber comprises: a laser configured to generate a laser beam; one or more mirrors to reflect the laser beam as it travels through the filtered ambient gas; a detector configured to receive the laser beam; a temperature and pressure sensor configured to determine a temperature and a pressure in the sample chamber; and a sensor electronics in communication with the laser, the detector, and the temperature and pressure sensor, where the sensor electronics may be configured to determine the measured real-time trace gas emissions from the filtered ambient gas.

In additional system embodiments, the sample chamber comprises: a trace gas measurement device, where the trace gas measurement device may be in communication with a sensor electronics, and where the sensor electronics may be configured to determine the measured real-time trace gas emissions from the filtered ambient gas.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present system allows for an open-cavity optical sensor for the novel use of monitoring real-time methane and/or trace gas emissions. In some embodiments, these disclosed sensors and methods may use an open cavity laser spectroscopy sensor.

Figure 1:
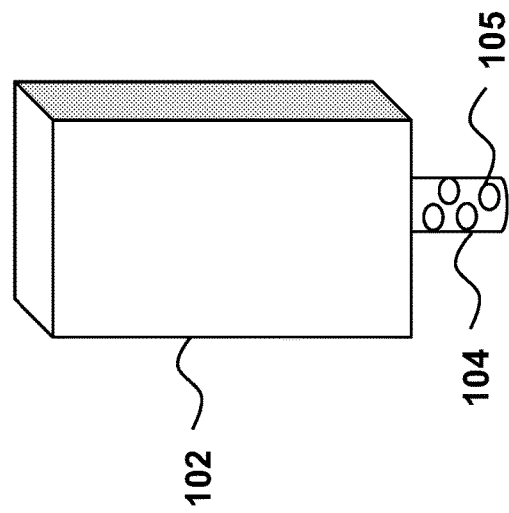
FIG. 1 depicts an open-cavity optical sensor external to an electronic enclosure, according to one embodiment.

FIG. 1 depicts an open-cavity optical sensor 104 external to an electronic enclosure 102, according to one embodiment. The open-cavity optical sensor 104 may include a laser, reflective mirrors, an optical detector, and a microprocessor. In the open-cavity optical sensor 104, the laser crosses the open cavity in one or more passes and is received by the optical sensor. The signal is converted to a trace gas concentration. In one embodiment, the open-cavity optical sensor 104 is mounted on the outside of the enclosure 102 such that free flowing air will pass through the open cavity of the sensor. The open-cavity optical sensor 104 may be used to monitor real-time trace gas emissions. In some embodiments, the open-cavity optical sensor 104 may be an open-cavity laser spectroscopy sensor.

The open-cavity optical sensor 104 may also include one or more of the following: communication through wireless transmission using licensed or unlicensed radio waves (e.g. 900 MHz band or Cellular or Satellite); delivery of trace gas emission data to an end utility, oil/gas producer or regulatory agency by means of wireless communication through an Internet connection; communicating with a sensor mesh (or other topology) located within and around a small area (e.g. well pad) in order to increase detection probability and reduce time to detection; aggregating multiple sensor to locate a source of a leak; communicating within a sensor mesh to measure trace gas emission for a wide spatial geographical region; performing real time detection of trace gas emissions; performing real time trace gas emission flow rate; simultaneous measurement and detection of ethane to classify natural gas from biological produced trace gases; and/or trace gas detection alarm notification (sound, light).

The open-cavity optical sensor 104 may have dust and water protection through the use of filter media or membrane 105 possessing a pore size to block dust and water, but allow free flow of methane or other trace gasses, in some embodiments. The open-cavity optical sensor 104 may use a laser, an LED, or other source of infrared light.

Figure 2B:
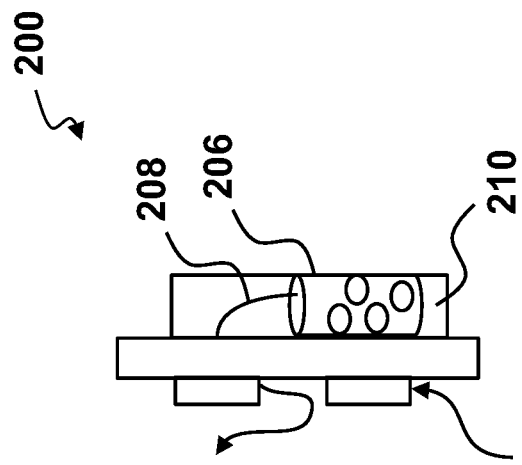
FIG. 2B depicts a side partial cut-away view of the open-cavity optical sensor of FIG. 2A, according to one embodiment.
Figure 2A:
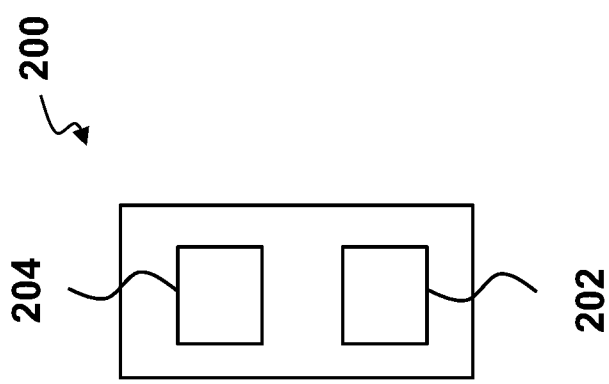
FIG. 2A depicts a front view of an open-cavity optical sensor within a ducted air flow, according to one embodiment.

FIG. 2A depicts a front view of an open-cavity optical sensor within a ducted air flow 200. FIG. 2B depicts a side partial cut-away view of the open-cavity optical sensor 206 of FIG. 2A. The open-cavity optical sensor 206 may be mounted inside an air duct 210 placed such that forced air flow 208 will pass through the open cavity of the sensor 206. The sensor 206 may be placed anywhere within the sample chamber, such as close to the inlet duct 202, outlet duct 204, central between the inlet duct 202 and outlet duct 204, or the like. In a preferred embodiment, the sensor 206 may be placed proximate the inlet duct 202. The open-cavity optical sensor 206 within a duct 210 is designed to create a low-pressure zone which will allow dust and water to drop out of the air flow stream. The low-pressure zone may be located proximate the inlet duct 202, where the cover or duct has a larger cross section than the inlet into the sample chamber. The duct acts like a hood over the inlet. Air enters the duct 210 via an air inlet 202, flows through the open cavity of the sensor 206, and flows out through an outlet duct 204. The open-cavity optical sensor 206 may be used to monitor real-time trace gas emissions. In some embodiments, the open-cavity optical sensor 206 may be an open-cavity laser spectroscopy sensor.

Figure 3A:
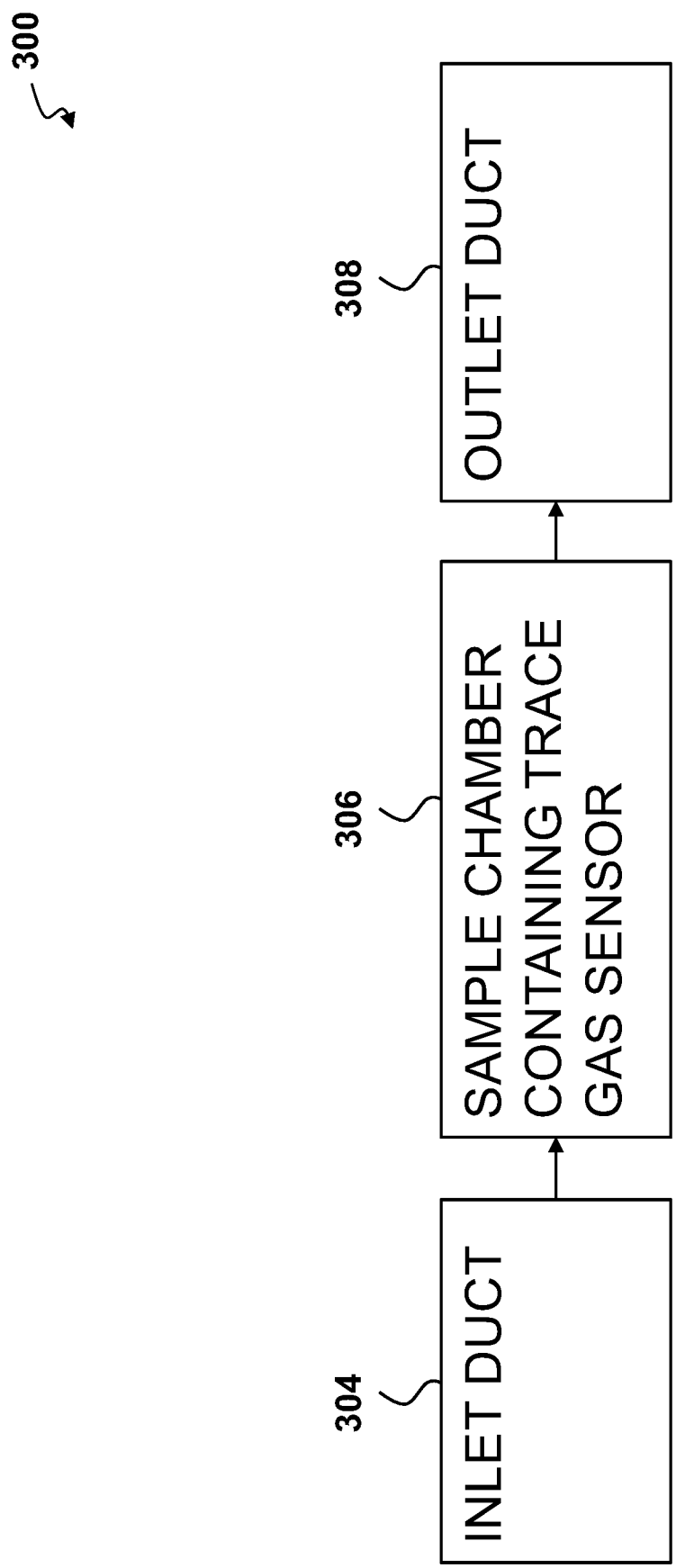
FIG. 3A depicts an embodiment of a system used to monitor real-time trace gas emissions, according to one embodiment.

FIG. 3A depicts an embodiment of a system 300 used to monitor real-time trace gas emissions. The system 300 may include an inlet duct 304, a sample chamber containing a trace gas sensor 306, and an outlet duct 308. The air may flow into the system 300 via the inlet duct, real-time trace gas measurements may be measured at the trace gas sensor 306, and the air flow may exit the system 300 out of the outlet duct 308.

Figure 3B:
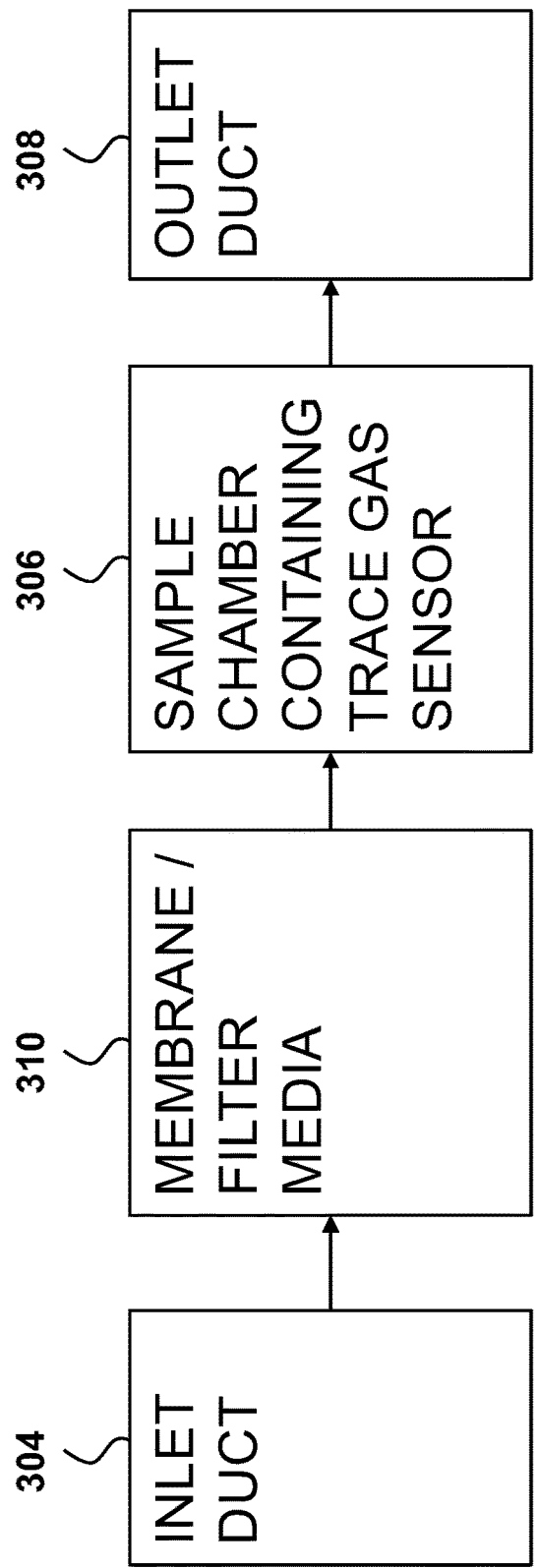
FIG. 3B depicts an alternate embodiment of a system used to monitor real-time trace gas emissions, according to one embodiment.

FIG. 3B depicts an alternate embodiment of a system 301 used to monitor real-time trace gas emissions. The system 301 may include an inlet duct 304, a membrane and/or filter media 310, a sample chamber containing a trace gas sensor 306, and an outlet duct 308. The air may flow into the system 300 via the inlet duct, the air may be filtered from dust and/or moisture at the membrane and/or filter media 310, real-time trace gas measurements may be measured at the trace gas sensor 306, and the air flow may exit the system 300 out of the outlet duct 308.

Figure 3C:
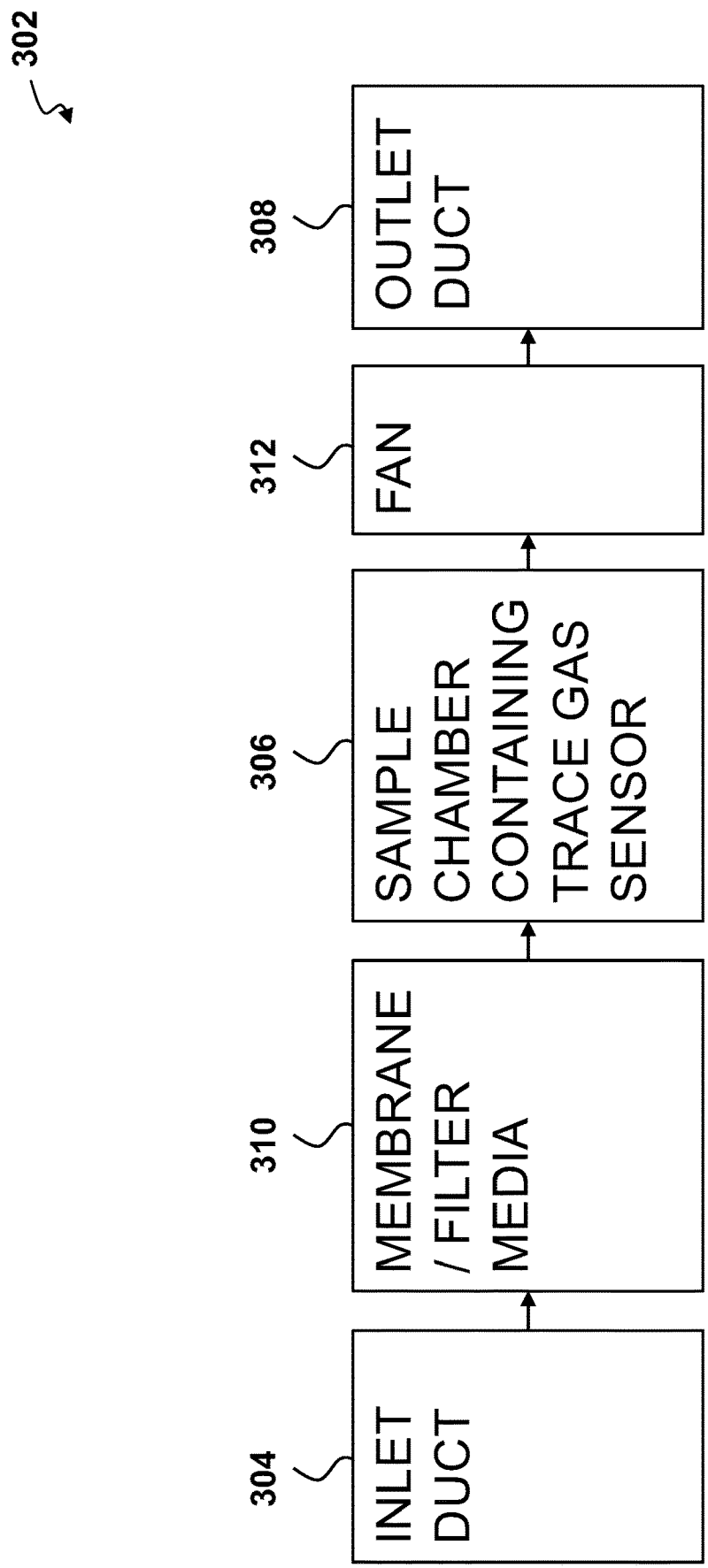
FIG. 3C depicts another alternate embodiment of a system used to monitor real-time trace gas emissions, according to one embodiment.

FIG. 3C depicts another alternate embodiment of a system 302 used to monitor real-time trace gas emissions. The system 302 may include an inlet duct 304, a membrane and/or filter media 310, a sample chamber containing a trace gas sensor 306, a fan 312, and an outlet duct 308. The air may flow into the system 300 via the inlet duct, the air may be filtered from dust and/or moisture at the membrane and/or filter media 310, real-time trace gas measurements may be measured at the trace gas sensor 306, and a fan 312 may move the air flow to exit the system 300 out of the outlet duct 308.

Figure 4:
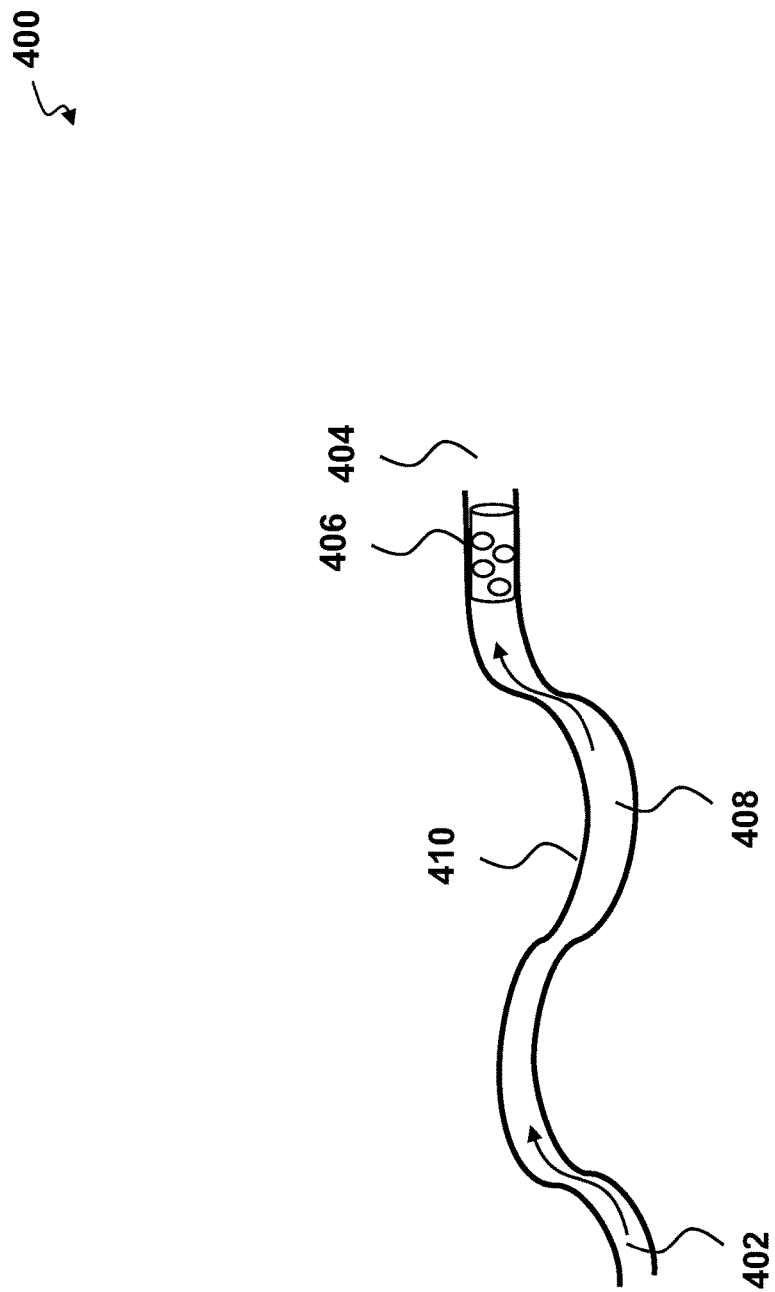
FIG. 4 depicts an open-cavity optical sensor within a duct with a low pressure dust and water trap, according to one embodiment.

FIG. 4 depicts a system 400 with an open-cavity optical sensor 406 within a duct 410 with a low pressure dust and water trap 408, according to one embodiment. Air enters through an air inlet 402, passes through the low pressure trap 408 to remove dust and/or moisture, passes through the open-cavity optical sensor 406, and exits through an air exhaust or air outlet 404. The trap 408 functions by going from a low cross sectional area to a large cross sectional area back to a low cross sectional area. The flow is in a closed channel equation (Q=vA), where v is the velocity of the fluid and A is the cross sectional area of the channel. Assuming the flow is incompressible, which is appropriate for this low pressure situation, Q remains constant throughout. If the cross section is varied, the disclosed system can control the velocity of the fluid and reduce it to a point where any suspended particles can drop out. The open-cavity optical sensor 406 may be used to monitor real-time trace gas emissions. In some embodiments, the open-cavity optical sensor 406 may be an open-cavity laser spectroscopy sensor.

Figure 5A:
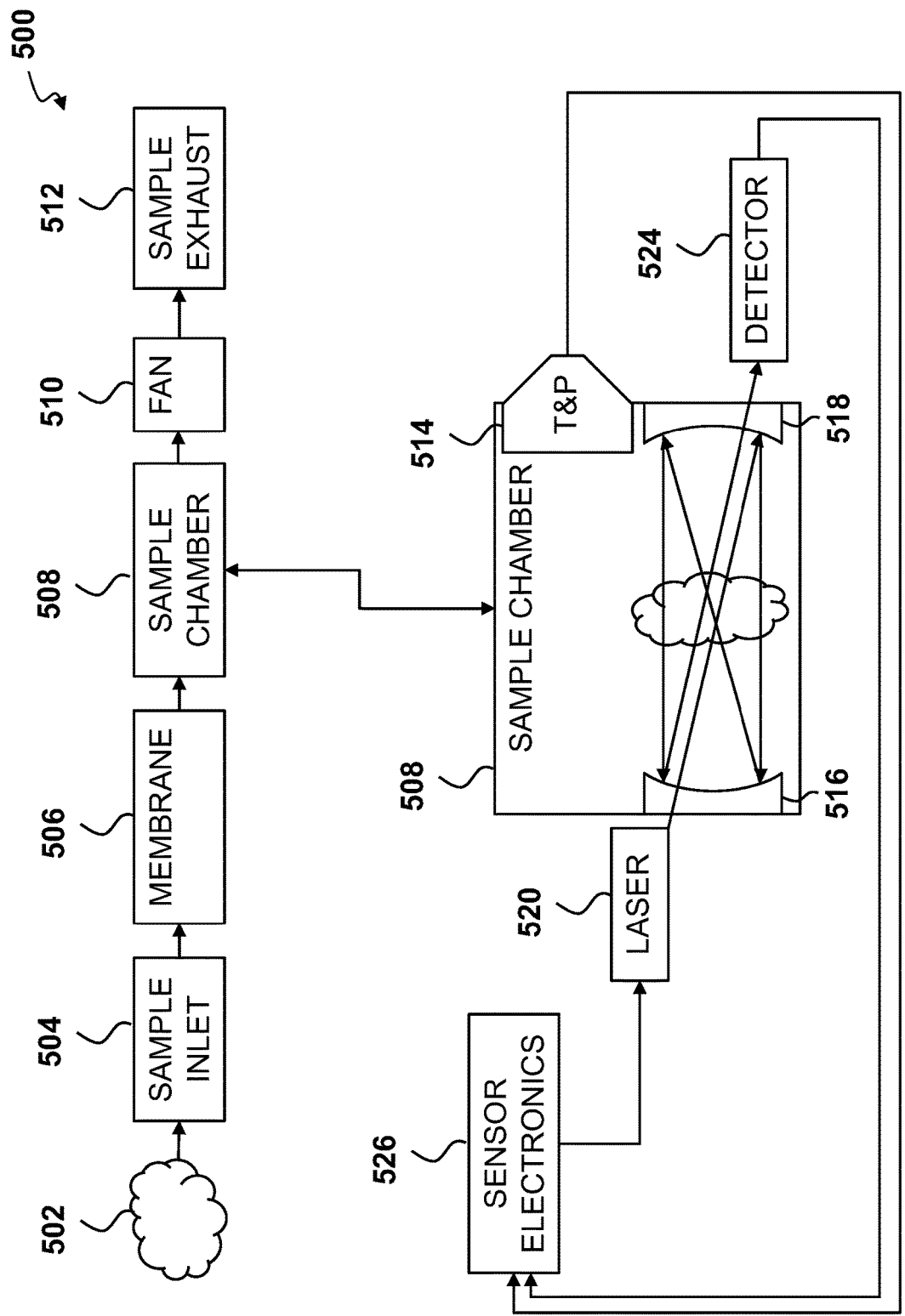
FIG. 5A depicts an embodiment of a system with a Herriott Cell for monitoring real-time trace gas emissions, according to one embodiment.

FIG. 5A depicts an embodiment of a system 500 with a Herriott Cell for monitoring real-time trace gas emissions. Ambient gas and/or a gas plume 502 is received into the sample inlet 504. A membrane 506 may filter dust and/or condensed moisture from the air flow. The filtered air flow may then be received into a sample chamber 508. The sample chamber 508 may contain a Herriott Cell. The Herriott Cell may include a laser 520; one or more Herriott Cell mirrors 516, 518; a detector 524; a temperature and/or pressure reading 514; and sensor electronics 526. The laser 520 may generate a laser beam that may be reflected several times between the mirrors 516, 518 and through the filtered air flow. The detector 524 may receive the laser beam and send a signal to the sensor electronics 526 where, in addition to the received temperature and/or pressure readings 514, the sensor electronics 526 may determine real-time trace gas emissions. After passing through the sample chamber 508, the air flow may pass through a fan 510 to expel the air flow via a sample exhaust 512.

Figure 5B:
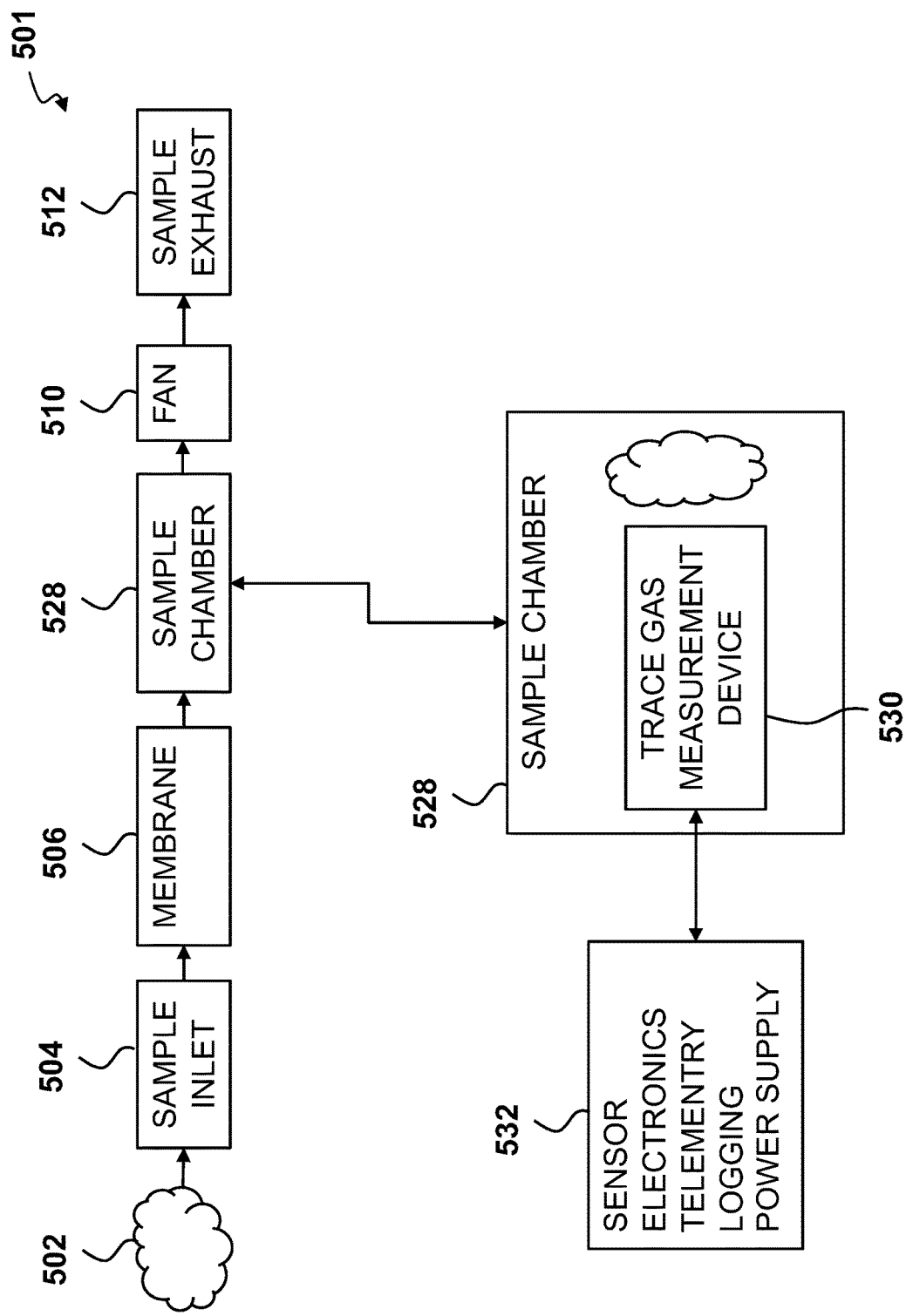
FIG. 5B depicts an embodiment of a system with a trace gas measurement device for monitoring real-time trace gas emissions, according to one embodiment.

FIG. 5B depicts an embodiment of a system 501 with a trace gas measurement device for monitoring real-time trace gas emissions. Ambient gas and/or a gas plume 502 is received into the sample inlet 504. A membrane 506 may filter dust and/or condensed moisture from the air flow. The filtered air flow may then be received into a sample chamber 528. The sample chamber 528 may include a trace gas measurement device 530 configured to measure trace gas in the air flow. The trace gas measurement device 530 may be in communication with sensor electronics 532 including telemetry, logging, and/or a power supply. After passing through the sample chamber 528, the air flow may pass through a fan 510 to expel the air flow via a sample exhaust 512.

Figure 6A:
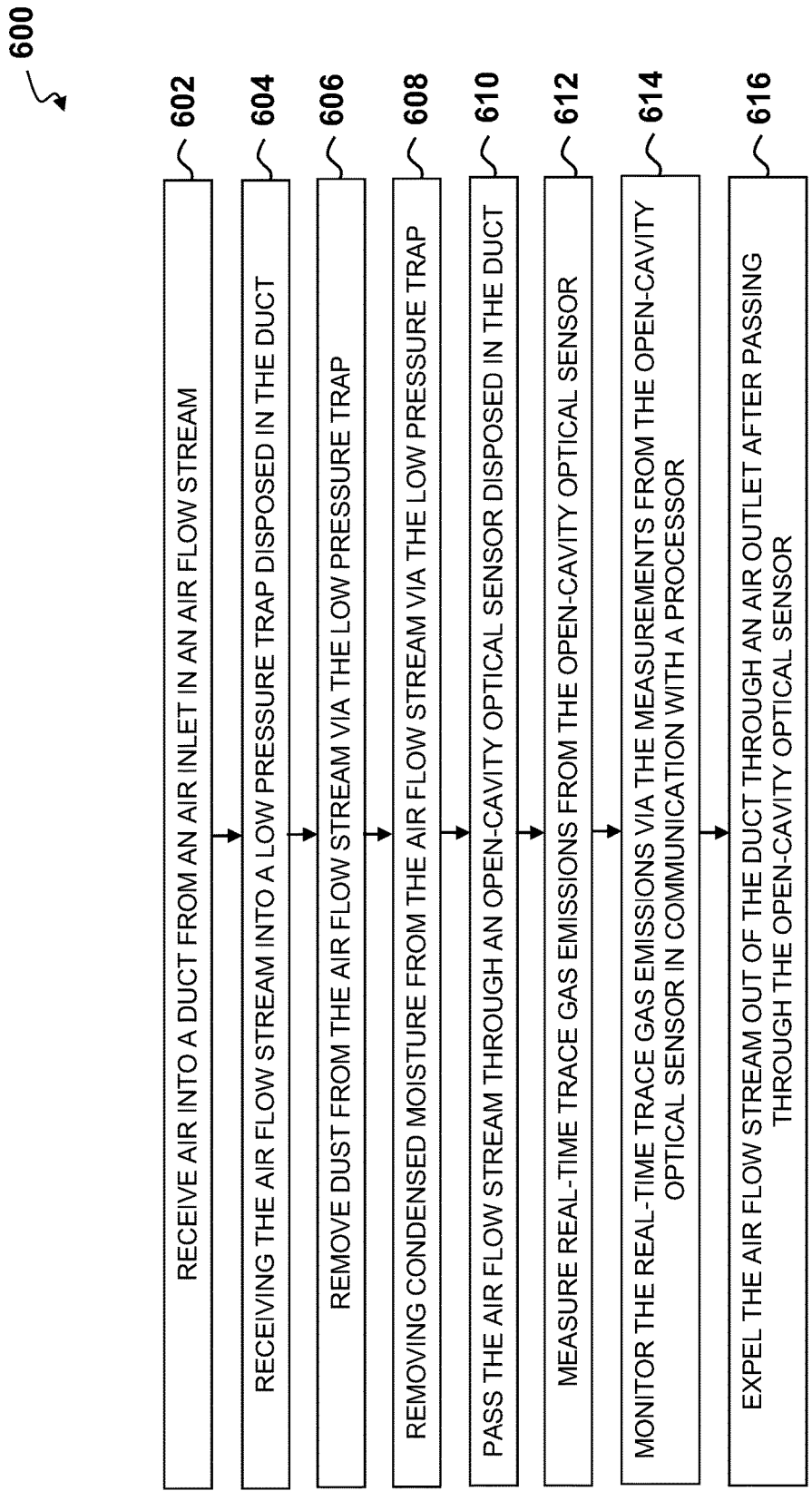
FIG. 6A depicts a high-level flowchart of a method embodiment for monitoring real-time methane and/or trace gas emissions, according to one embodiment.

FIG. 6A depicts a high-level flowchart of a method embodiment 600 for monitoring real-time methane and/or trace gas emissions. The method 600 may include receiving air into a duct from an air inlet in an air flow stream (step 602). The method 600 may then include receiving the air flow stream into a low pressure trap disposed in the duct (step 604). The method 600 may then include removing dust (step 606) and/or removing condensed moisture (step 608) from the air flow stream via the low pressure trap. The method 600 may then include passing the air flow stream through an open-cavity optical sensor disposed in the duct (step 610). The method 600 may then include measuring real-time trace gas emissions from the open-cavity optical sensor (step 612). The method 600 may then include monitoring the real-time trace gas emissions via the measurements from the open-cavity optical sensor in communication with a processor (step 614). The method 600 may then include expelling the air flow stream out of the duct through an air outlet after passing through the open-cavity optical sensor (step 616).

Figure 6B:
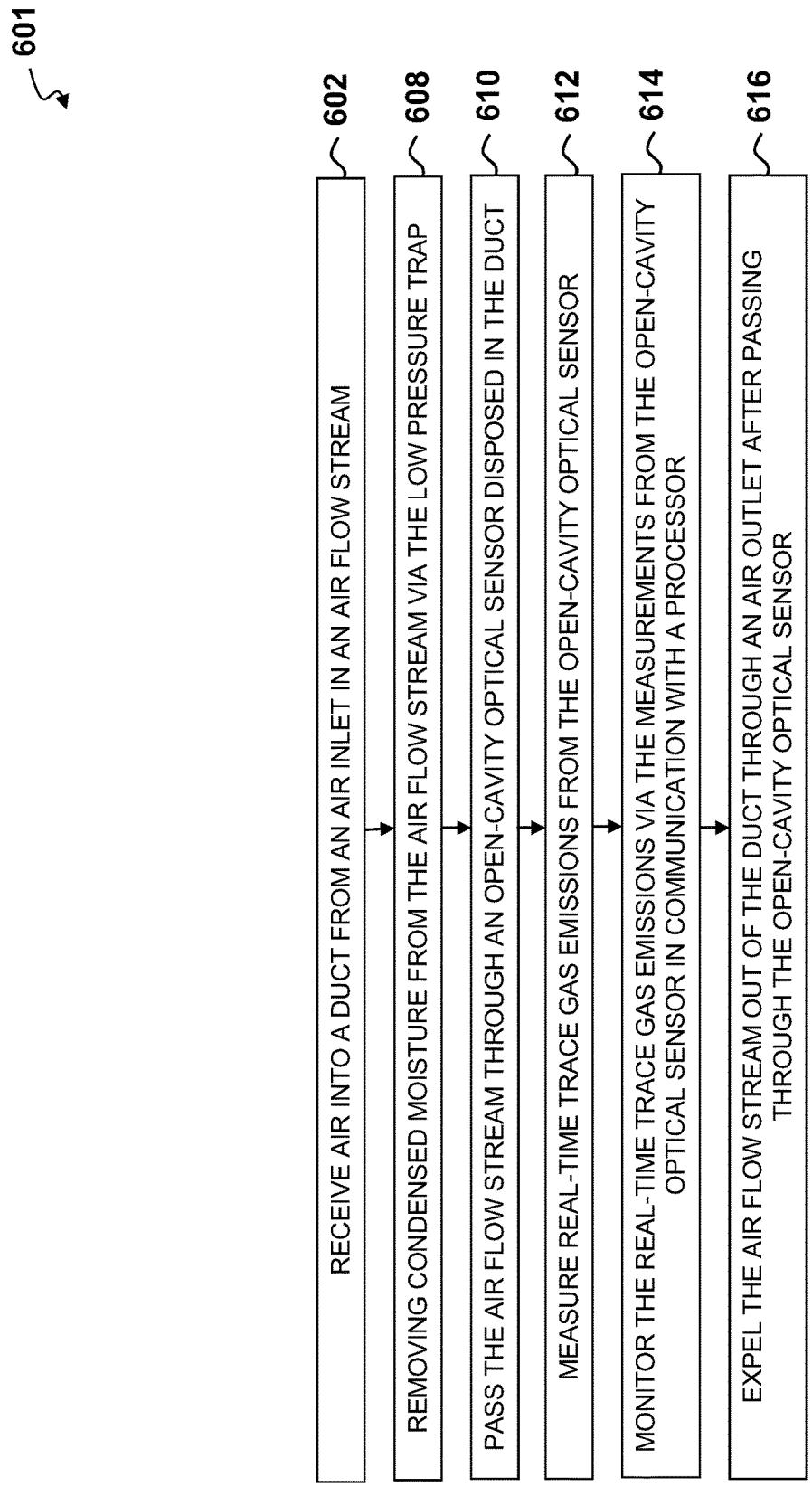
FIG. 6B depicts a high-level flowchart of an alternate method embodiment for monitoring real-time methane and/or trace gas emissions, according to one embodiment.

FIG. 6B depicts a high-level flowchart of an alternate method embodiment 601 for monitoring real-time methane and/or trace gas emissions. The method 601 may include receiving air into a duct from an air inlet in an air flow stream (step 602). The method 601 may then include removing condensed moisture (step 608) from the air flow stream via the low pressure trap. The method 601 may then include passing the air flow stream through an open-cavity optical sensor disposed in the duct (step 610). The method 601 may then include measuring real-time trace gas emissions from the open-cavity optical sensor (step 612). The method 601 may then include monitoring the real-time trace gas emissions via the measurements from the open-cavity optical sensor in communication with a processor (step 614). The method 601 may then include expelling the air flow stream out of the duct through an air outlet after passing through the open-cavity optical sensor (step 616).

Figure 7:
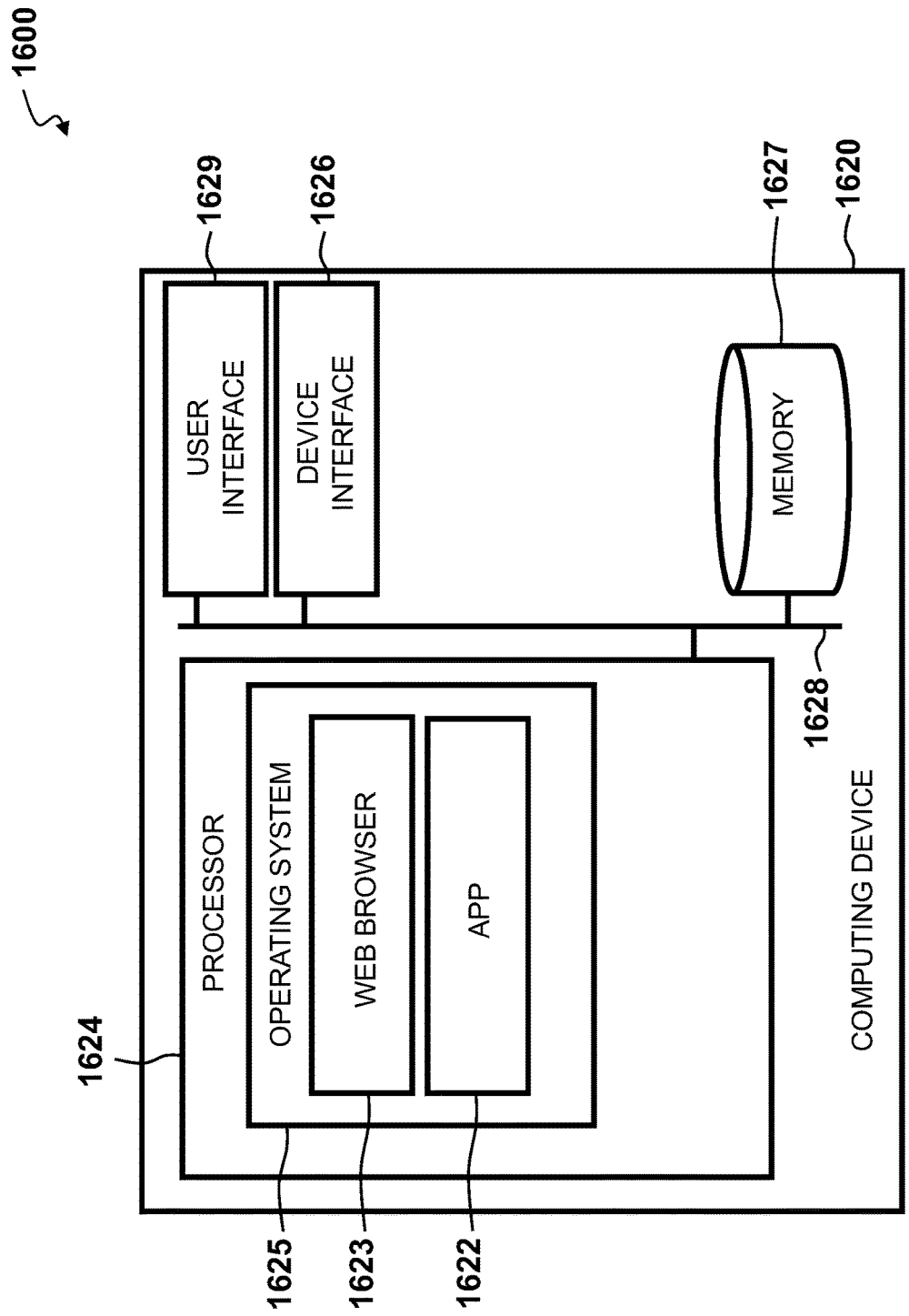
FIG. 7 illustrates an example top-level functional block diagram of a computing device embodiment, according to one embodiment.

FIG. 7 illustrates an example of a top-level functional block diagram of a computing device embodiment 1600.

The example operating environment is shown as a computing device 1620 comprising a processor 1624, such as a central processing unit (CPU), addressable memory 1627, an external device interface 1626, e.g., an optional universal serial bus port and related processing, and/or an Ethernet port and related processing, and an optional user interface 1629, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 1628. In some embodiments, via an operating system 1625 such as one supporting a web browser 1623 and applications 1622, the processor 1624 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 8:
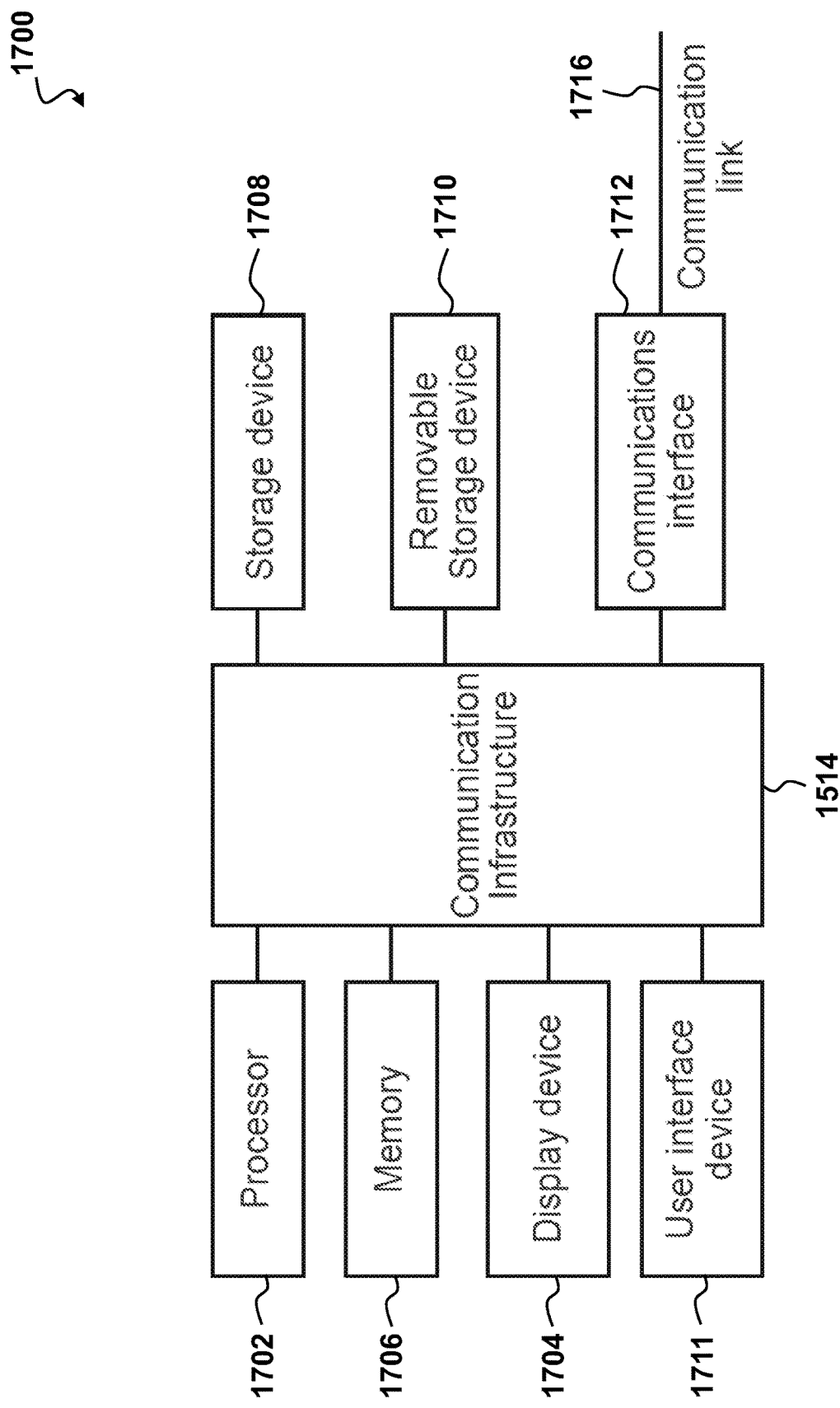
FIG. 8 shows a high-level block diagram and process of a computing system for implementing an embodiment of the system and process, according to one embodiment.

FIG. 8 is a high-level block diagram 1700 showing a computing system comprising a computer system useful for implementing an embodiment of the system and process, disclosed herein. Embodiments of the system may be implemented in different computing environments. The computer system includes one or more processors 1702, and can further include an electronic display device 1704 (e.g., for displaying graphics, text, and other data), a main memory 1706 (e.g., random access memory (RAM)), storage device 1708, a removable storage device 1710 (e.g., removable storage drive, a removable memory module, a magnetic tape drive, an optical disk drive, a computer readable medium having stored therein computer software and/or data), user interface device 1711 (e.g., keyboard, touch screen, keypad, pointing device), and a communication interface 1712 (e.g., modem, a network interface (such as an Ethernet card), a communications port, or a PCMCIA slot and card). The communication interface 1712 allows software and data to be transferred between the computer system and external devices. The system further includes a communications infrastructure 1714 (e.g., a communications bus, cross-over bar, or network) to which the aforementioned devices/modules are connected as shown.

Information transferred via communications interface 1714 may be in the form of signals such as electronic, electromagnetic, optical, or other signals capable of being received by communications interface 1714, via a communication link 1716 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1712. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 9:
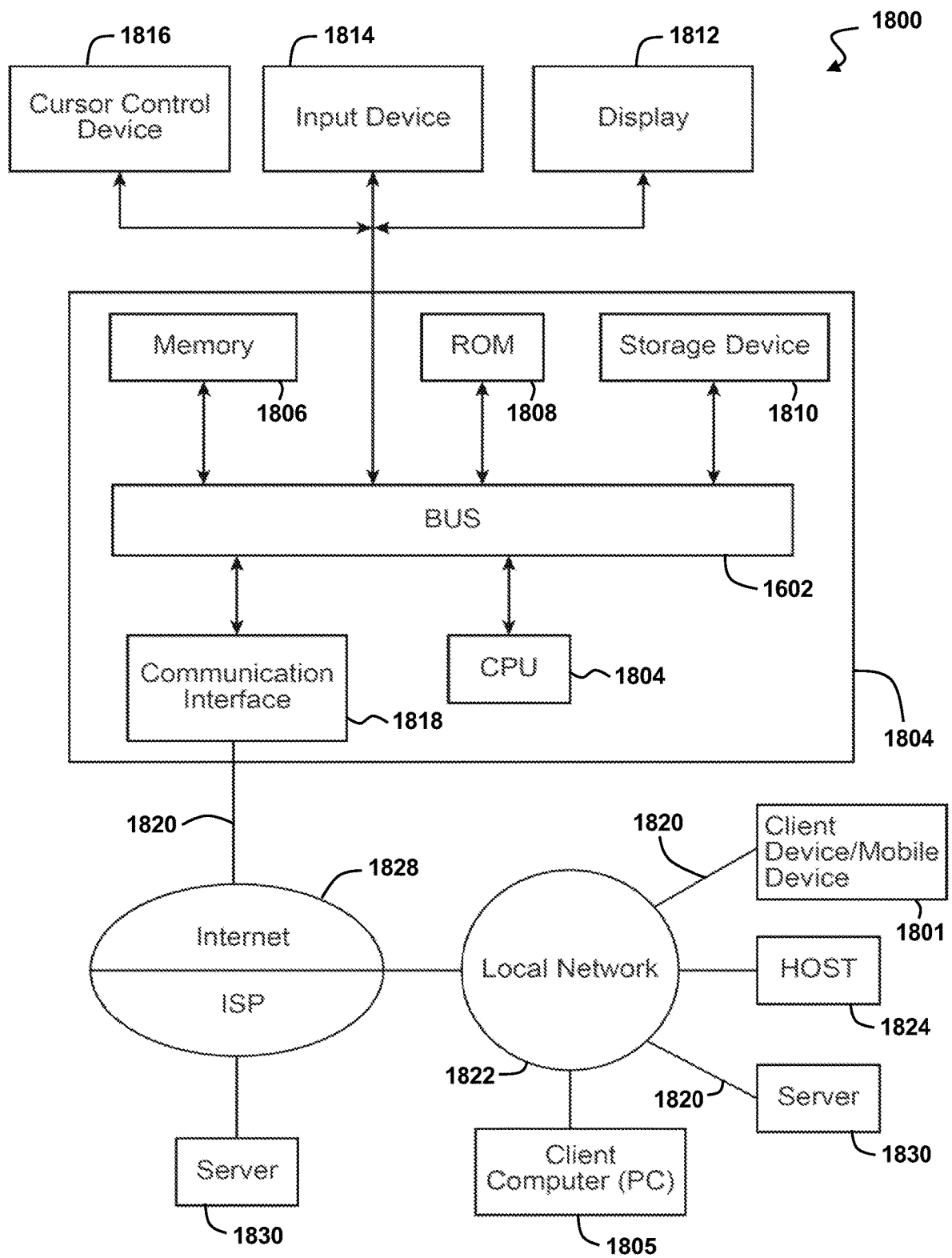
FIG. 9 shows a block diagram and process of an exemplary system in which an embodiment may be implemented, according to one embodiment.

FIG. 9 shows a block diagram of an example system 1800 in which an embodiment may be implemented. The system 1800 includes one or more client devices 1801 such as consumer electronics devices, connected to one or more server computing systems 1830. A server 1830 includes a bus 1802 or other communication mechanism for communicating information, and a processor (CPU) 1804 coupled with the bus 1802 for processing information. The server 1830 also includes a main memory 1806, such as a random access memory (RAM) or other dynamic storage device, coupled to the bus 1802 for storing information and instructions to be executed by the processor 1804. The main memory 1806 also may be used for storing temporary variables or other intermediate information during execution or instructions to be executed by the processor 1804. The server computer system 1830 further includes a read only memory (ROM) 1808 or other static storage device coupled to the bus 1802 for storing static information and instructions for the processor 1804. A storage device 1810, such as a magnetic disk or optical disk, is provided and coupled to the bus 1802 for storing information and instructions. The bus 1802 may contain, for example, thirty-two address lines for addressing video memory or main memory 1806. The bus 1802 can also include, for example, a 32-bit data bus for transferring data between and among the components, such as the CPU 1804, the main memory 1806, video memory and the storage 1810. Alternatively, multiplex data/address lines may be used instead of separate data and address lines.

The server 1830 may be coupled via the bus 1802 to a display 1812 for displaying information to a computer user. An input device 1814, including alphanumeric and other keys, is coupled to the bus 1802 for communicating information and command selections to the processor 1804. Another type or user input device comprises cursor control 1816, such as a mouse, a trackball, or cursor direction keys for communicating direction information and command selections to the processor 1804 and for controlling cursor movement on the display 1812.

According to one embodiment, the functions are performed by the processor 1804 executing one or more sequences of one or more instructions contained in the main memory 1806. Such instructions may be read into the main memory 1806 from another computer-readable medium, such as the storage device 1810. Execution of the sequences of instructions contained in the main memory 1806 causes the processor 1804 to perform the process steps described herein. One or more processors in a multi-processing arrangement may also be employed to execute the sequences of instructions contained in the main memory 1806. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1804 for execution. Such a medium may take many forms, including but not limited to, non-volatile media, volatile media, and transmission media. Non-volatile media includes, for example, optical or magnetic disks, such as the storage device 1810. Volatile media includes dynamic memory, such as the main memory 1806. Transmission media includes coaxial cables, copper wire and fiber optics, including the wires that comprise the bus 1802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1804 for execution. For example, the instructions may initially be carried on a magnetic disk of a remote computer. The remote computer can load the instructions into its dynamic memory and send the instructions over a telephone line using a modem. A modem local to the server 1830 can receive the data on the telephone line and use an infrared transmitter to convert the data to an infrared signal. An infrared detector coupled to the bus 1802 can receive the data carried in the infrared signal and place the data on the bus 1802. The bus 1802 carries the data to the main memory 1806, from which the processor 1804 retrieves and executes the instructions. The instructions received from the main memory 1806 may optionally be stored on the storage device 1810 either before or after execution by the processor 1804.

The server 1830 also includes a communication interface 1818 coupled to the bus 1802. The communication interface 1818 provides a two-way data communication coupling to a network link 1820 that is connected to the world wide packet data communication network now commonly referred to as the Internet 1828. The Internet 1828 uses electrical, electromagnetic or optical signals that carry digital data streams. The signals through the various networks and the signals on the network link 1820 and through the communication interface 1818, which carry the digital data to and from the server 1830, are exemplary forms or carrier waves transporting the information.

In another embodiment of the server 1830, interface 1818 is connected to a network 1822 via a communication link 1820. For example, the communication interface 1818 may be an integrated services digital network (ISDN) card or a modem to provide a data communication connection to a corresponding type of telephone line, which can comprise part of the network link 1820. As another example, the communication interface 1818 may be a local area network (LAN) card to provide a data communication connection to a compatible LAN. Wireless links may also be implemented. In any such implementation, the communication interface 1818 sends and receives electrical electromagnetic or optical signals that carry digital data streams representing various types of information.

The network link 1820 typically provides data communication through one or more networks to other data devices. For example, the network link 1820 may provide a connection through the local network 1822 to a host computer 1824 or to data equipment operated by an Internet Service Provider (ISP). The ISP in turn provides data communication services through the Internet 1828. The local network 1822 and the Internet 1828 both use electrical, electromagnetic or optical signals that carry digital data streams. The signals through the various networks and the signals on the network link 1820 and through the communication interface 1818, which carry the digital data to and from the server 1830, are exemplary forms or carrier waves transporting the information.

The server 1830 can send/receive messages and data, including e-mail, program code, through the network, the network link 1820 and the communication interface 1818. Further, the communication interface 1818 can comprise a USB/Tuner and the network link 1820 may be an antenna or cable for connecting the server 1830 to a cable provider, satellite provider or other terrestrial transmission system for receiving messages, data and program code from another source.

The example versions of the embodiments described herein may be implemented as logical operations in a distributed processing system such as the system 1800 including the servers 1830. The logical operations of the embodiments may be implemented as a sequence of steps executing in the server 1830, and as interconnected machine modules within the system 1800. The implementation is a matter of choice and can depend on performance of the system 1800 implementing the embodiments. As such, the logical operations constituting said example versions of the embodiments are referred to for e.g., as operations, steps or modules.

Similar to a server 1830 described above, a client device 1801 can include a processor, memory, storage device, display, input device and communication interface (e.g., e-mail interface) for connecting the client device to the Internet 1828, the ISP, or LAN 1822, for communication with the servers 1830.

The system 1800 can further include computers (e.g., personal computers, computing nodes) 1805 operating in the same manner as client devices 1801, where a user can utilize one or more computers 1805 to manage data in the server 1830.

Figure 10:
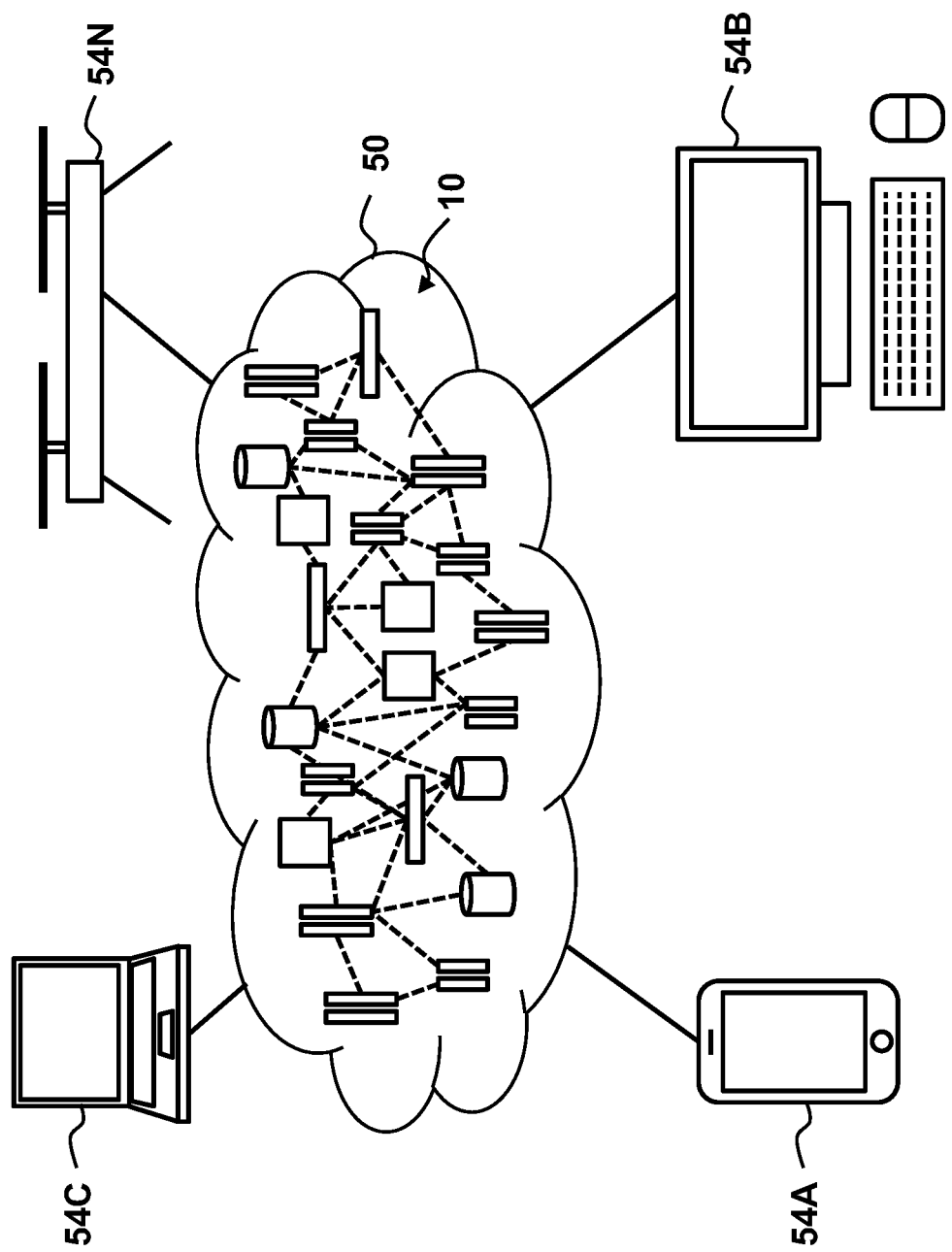
FIG. 10 depicts a cloud-computing environment for implementing an embodiment of the system and process disclosed herein, according to one embodiment.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial system (UAS) 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
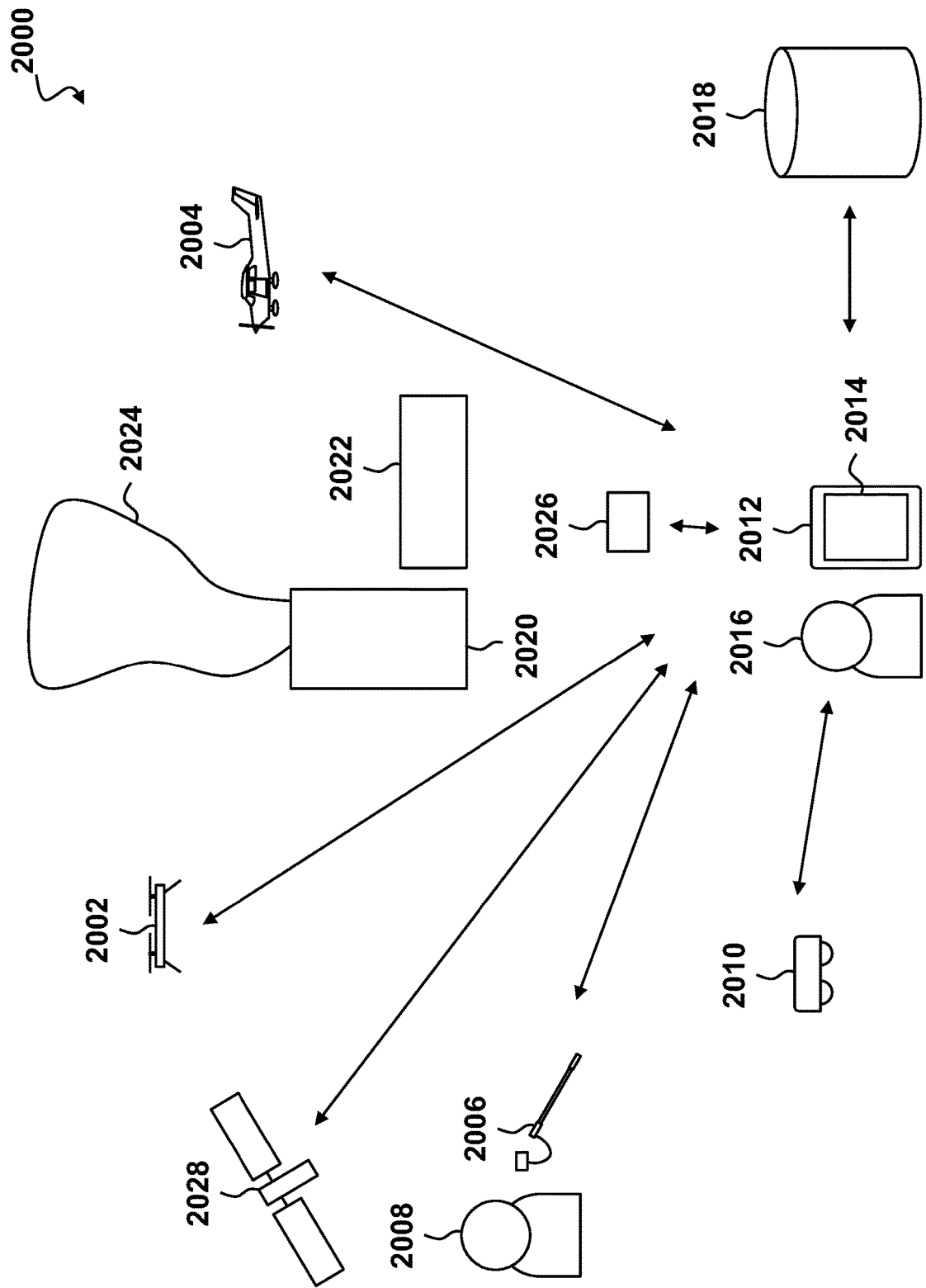
FIG. 11 depicts a system for detecting trace gasses, according to one embodiment.

FIG. 11 depicts a system 2000 for detecting trace gasses, according to one embodiment. The system may include one or more trace gas sensors located in one or more vehicles 2002, 2004, 2006, 2010, 2028. The one or more trace gas sensors may detect elevated trace gas concentrations from one or more potential gas sources 2020, 2022, such as a holding tank, pipeline, or the like. The potential gas sources 2020, 2022 may be part of a large facility, a small facility, or any location. The potential gas sources 2020, 2022 may be clustered and/or disposed distal from one another. The one or more trace gas sensors may be used to detect and quantify leaks of toxic gases, e.g., hydrogen disulfide, or environmentally damaging gases, e.g., methane, sulfur dioxide) in a variety of industrial and environmental contexts. Detection and quantification of these leaks are of interest to a variety of industrial operations, such as oil and gas, chemical production, and painting. Detection and quantification of leaks is also of value to environmental regulators for assessing compliance and for mitigating environmental and safety risks. In some embodiments, the at least one trace gas sensor may be configured to detect methane. In other embodiments, the at least one trace gas sensor may be configured to detect sulfur oxide, such as SO, $SO_2$, $SO_3$, $S7O_2$, $S6O_2$, $S2O_2$, and the like. A trace gas leak 2024 may be present in a potential gas source 2020. The one or more trace gas sensors may be used to identify the trace gas leak 2024 and/or the source 2020 of the trace gas leak 2024 so that corrective action may be taken.

The one or more vehicles 2002, 2004, 2006, 2010, 2028 may include an unmanned aerial vehicle (UAV) 2002, an aerial vehicle 2004, a handheld device 2006, a ground vehicle 2010, and a satellite 2028. In some embodiments, the UAV 2002 may be a quadcopter or other device capable of hovering, making sharp turns, and the like. In other embodiments, the UAV 2002 may be a winged aerial vehicle capable of extended flight time between missions. The UAV 2002 may be autonomous or semi-autonomous in some embodiments. In other embodiments, the UAV 2002 may be manually controlled by a user. The aerial vehicle 2004 may be a manned vehicle in some embodiments. The handheld device 2006 may be any device having one or more trace gas sensors operated by a user 2008. In one embodiment, the handheld device 2006 may have an extension for keeping the one or more trace gas sensors at a distance from the user 2008. The ground vehicle 2010 may have wheels, tracks, and/or treads in one embodiment. In other embodiments, the ground vehicle 2010 may be a legged robot. In some embodiments, the ground vehicle 2010 may be used as a base station for one or more UAVs 2002. The satellite 2028 may be used to capture images of a site for identify a trace gas leak 2024 and/or the source 2020 of the trace gas leak 2024. In some embodiments, one or more aerial devices, such as the UAV 2002, a balloon, or the like, may be tethered to the ground vehicle 2010. In some embodiments, one or more trace gas sensors may be located in one or more stationary monitoring devices 2026. The one or more stationary monitoring devices may be located proximate one or more potential gas sources 2020, 2022. In some embodiments, the one or more stationary monitoring devices may be relocated.

The one or more vehicles 2002, 2004, 2006, 2010, 2028 and/or stationary monitoring devices 2026 may transmit data including trace gas data to a ground control station (GCS) 2012. The GCS may include a display 2014 for displaying the trace gas concentrations to a GCS user 2016. The GCS user 2016 may be able to take corrective action if a gas leak 2024 is detected, such as by ordering a repair of the source 2020 of the trace gas leak. The GCS user 2016 may be able to control movement of the one or more vehicles 2002, 2004, 2006, 2010 in order to confirm a presence of a trace gas leak in some embodiments.

In some embodiments, the GCS 2012 may transmit data to a cloud server 2018. In some embodiments, the cloud server 2018 may perform additional processing on the data. In some embodiments, the cloud server 2018 may provide third party data to the GCS 2012, such as wind speed, temperature, pressure, weather data, or the like.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
   an air inlet configured to receive air;
   an air outlet configured to expel air;
   a duct connected between the air inlet and the air outlet;
   an open-cavity sensor disposed in the duct, wherein an air flow stream within the duct passes through the open-cavity sensor, and wherein the open-cavity sensor is configured to detect at least one trace gas in the air flow stream;
   a low pressure trap disposed in the duct prior to the air flow stream passing through the open-cavity sensor; and
   a processor configured to determine trace gas emission measurements based on trace gas detection by the open-cavity sensor.

2. The system of claim 1, wherein the processor is further configured to determine trace gas concentrations based on the trace gas detection by the open-cavity sensor.

3. The system of claim 1, wherein the open-cavity sensor is an open-cavity optical sensor.

4. The system of claim 1, wherein the processor is further configured to monitor real-time trace gas emissions based on the trace gas detection by the open-cavity sensor.

5. The system of claim 1, wherein the low pressure trap is configured to remove dust from the air flow stream prior to reaching the open-cavity sensor.

6. The system of claim 1, wherein the low pressure trap is configured to remove condensed moisture from the air flow stream prior to reaching the open-cavity sensor.

7. The system of claim 1, wherein the duct comprises a first cross sectional area, wherein the low pressure trap comprises a second cross sectional area, and wherein the second cross sectional area is larger than the first cross sectional area.

8. The system of claim 1, wherein the open-cavity sensor is in communication with a processor to monitor real-time trace gas emissions.

9. The system of claim 1, wherein the open-cavity sensor is an open-cavity laser spectroscopy sensor.

10. The system of claim 1, further comprising:
    a membrane disposed before the open-cavity sensor in the air flow stream.

11. The system of claim 10, wherein the membrane is configured to remove dust from the air flow stream prior to reaching the open-cavity sensor.

12. The system of claim 10, wherein the membrane is configured to remove condensed moisture from the air flow stream prior to reaching the open-cavity sensor.

13. The system of claim 1, further comprising:
    a fan disposed after the open-cavity sensor in the air flow stream, wherein the fan is configured to expel the air flow stream via the air outlet.

14. A method, comprising:
    receiving air into a duct from an air inlet in an air flow stream;
    receiving air into a low pressure trap disposed in the duct prior to the air flow stream passing through an open-cavity sensor disposed in the duct;
    passing the air flow stream through the open-cavity sensor disposed in the duct;
    expelling the air flow stream out of the duct through an air outlet after passing through the open-cavity sensor;
    detecting, by the open-cavity sensor, at least one trace gas in the air flow stream; and
    determining, by a processor, trace gas emission measurements based on trace gas detection by the open-cavity sensor.

15. The method of claim 14, further comprising:
    determining, by the processor, trace gas concentrations based on the trace gas detection by the open-cavity sensor.

16. The method of claim 14, wherein the open-cavity sensor is an open-cavity optical sensor.

17. The method of claim 14, further comprising:
    monitoring, by the processor, real-time trace gas emissions based on the trace gas detection by the open-cavity sensor.

18. The method of claim 14, further comprising:
    removing dust from the air flow stream via the low pressure trap prior to reaching the open-cavity sensor.

19. The method of claim 14, further comprising:
    removing condensed moisture from the air flow stream via the low pressure trap prior to reaching the open-cavity sensor.

20. The method of claim 14, wherein the open-cavity sensor is an open-cavity laser spectroscopy sensor.

* * * * *